(12) United States Patent
Aughton et al.

(10) Patent No.: US 11,913,185 B2
(45) Date of Patent: Feb. 27, 2024

(54) MULTI PULLEY CONTROL GATE

(71) Applicant: RUBICON RESEARCH PTY LTD, Hawthorn East (AU)

(72) Inventors: David John Aughton, Hawthorn East (AU); Joel Michael Delacorn, Hawthorn East (AU)

(73) Assignee: RUBICON RESEARCH PTY LTD, Hawthorn East (AU)

( * ) Notice: Subject to any disclaimer, the term of this patent is extended or adjusted under 35 U.S.C. 154(b) by 218 days.

(21) Appl. No.: 17/630,337

(22) PCT Filed: Jul. 21, 2020

(86) PCT No.: PCT/AU2020/050748
§ 371 (c)(1),
(2) Date: Jan. 26, 2022

(87) PCT Pub. No.: WO2021/016654
PCT Pub. Date: Feb. 4, 2021

(65) Prior Publication Data
US 2022/0267976 A1    Aug. 25, 2022

(30) Foreign Application Priority Data

Jul. 26, 2019 (AU) ................................ 2019902677

(51) Int. Cl.
*E02B 7/40*     (2006.01)
*E02B 13/02*    (2006.01)
(Continued)

(52) U.S. Cl.
CPC .............. *E02B 13/02* (2013.01); *E02B 7/42* (2013.01); *G05D 9/12* (2013.01)

(58) Field of Classification Search
CPC .. E02B 13/02; E02B 7/42; E02B 7/44; G05D 9/12; F16L 55/1018
See application file for complete search history.

(56) References Cited

U.S. PATENT DOCUMENTS 797,581 A     8/1905  Icke
1,275,499 A   8/1918  Thorsby
(Continued)

FOREIGN PATENT DOCUMENTS

WO    0216698 A1    2/2002
WO    02071163 A1   9/2002
(Continued)

OTHER PUBLICATIONS

International Search Report dated Sep. 29, 2020 for corresponding International Application No. PCT/AU2020/050748, dated Jul. 21, 2020.
(Continued)

*Primary Examiner* — Carib A Oquendo
(74) *Attorney, Agent, or Firm* — David D. Brush; Westman, Champlin & Koehler, P.A.

(57) ABSTRACT

A control gate adapted to be installed across a channel for liquids. The control gate includes a barrier member with a side member that has a circular arcuate section, the barrier member being pivotally mounted at or adjacent to the base of the channel; and a drive for raising and lowering the barrier member. The drive includes a cable, motor and first and second pulleys. The first pulley is coupled to the motor, the cable is secured to opposite first and second ends of the arcuate section, with the second pulley being adjacent to the arcuate section. The cable passes along the arcuate section from the one end to pass under the second pulley in contact therewith, is looped around the first pulley, above the second pulley, then passes under the second pulley and is secured to the second end of the arcuate section.

14 Claims, 9 Drawing Sheets

(51) Int. Cl.
  *E02B 7/42* (2006.01)
  *G05D 9/12* (2006.01)

(56) References Cited

U.S. PATENT DOCUMENTS

| | | | |
|---|---|---|---|
| 2,909,899 | A | 10/1959 | Ramsden et al. |
| D613,422 | S * | 4/2010 | Aughton .................... D25/48.5 |
| 2003/0016660 | A1 * | 1/2003 | Yamashita ........... G01G 19/393 |
| | | | 370/465 |
| 2004/0009041 | A1 * | 1/2004 | Aughton ................... G01F 1/40 |
| | | | 405/87 |
| 2017/0044731 | A1 * | 2/2017 | Yoshiki ..................... E02B 7/50 |
| 2017/0350531 | A1 | 12/2017 | Aughton |

FOREIGN PATENT DOCUMENTS

| | | | |
|---|---|---|---|
| WO | 2013016769 | A1 | 2/2013 |
| WO | 2013149304 | A1 | 10/2013 |
| WO | 2015031954 | A1 | 3/2015 |

OTHER PUBLICATIONS

Written Opinion of the International Searching Authority dated Sep. 29, 2020 for corresponding International Application No. PCT/AU2020/050748, filed Jul. 21, 2020.

* cited by examiner

MULTI PULLEY CONTROL GATE

CROSS-REFERENCE TO RELATED APPLICATIONS

This Application is a Section 371 National Stage Application of International Application No. PCT/AU2020/050748, filed Jul. 21, 2020, which is incorporated by reference in its entirety and published as WO 2021/016654 A1 on Feb. 4, 2021.

FIELD OF THE INVENTION

This invention relates to control gates for flow and level control of liquids and to lifting mechanisms for such gates.

SUMMARY OF THE INVENTION

With these objects in view the present invention may provide a control gate adapted to be installed across a channel for liquids, the control gate comprising: a barrier member with a side member or offset member that has a circular arcuate section, said barrier member being pivotally mounted at or adjacent to the base of said channel; and a drive for raising and lowering said barrier member to regulate flow of liquid through said control gate, said drive including a cable, motor and first and second pulleys, said first pulley coupled to said motor, said cable secured to opposite first and second ends of said circular arcuate section under tension with said second pulley being adjacent to said circular arcuate section, said cable passing along said circular arcuate section from said one end to pass under said second pulley in contact therewith, said cable then being looped under tension at least once around said first pulley located above said second pulley, said cable then passing under said second pulley in contact with the opposite face of said second pulley to be secured to said second end of said arcuate section in order to maintain said cable in a substantially peripheral contact with said circular arcuate section, said second pulley transferring rotary motion of said first pulley into motion of said side member or offset member to movement of said barrier member to regulate flow of water through said control gate.

Preferably the motion of said side member or offset member is an angular displacement motion, and wherein said side member tilting in one direction raises said barrier member and said side member tilting in an opposite direction lowers said barrier member.

In a practical embodiment, based on its direction, rotation of said second pulley will lengthen or shorten said cable on its opposing sides.

Preferably said circular arcuate section includes a pair of flanges to guide said cable along said circular arcuate section.

In a further embodiment, said control gate has a support frame, wherein said barrier member has two side members with respective circular arcuate sections and respective pairs of pulleys and cables, said side members sealingly engaged with said support frame within said channel. Preferably said respective first pulleys are coupled to opposite ends of a controlled motor driven shaft. The opposite ends of said controlled motor driven shaft may be located in respective bearings on opposite walls of said channel.

In a further aspect said respective first pulleys are coupled to respective controlled motors.

Preferably each motor is mounted on a support beam bridging said channel or each motor is mounted on top of opposite walls of said channel.

In another aspect the distance between said first and second pulleys will depend on the depth of said channel.

Preferably said first and second pulleys act in a dual sheave manner. In an embodiment each second pulley has a pair of grooves for said cable and/or each first pulley has a larger diameter and width than each second pulley with multiple grooves formed thereon on either side of centre thereof for said cable.

BRIEF DESCRIPTION OF THE DRAWINGS

In order that the invention may be more readily understood and put into practical effect, reference will now be made to the accompanying drawings, in which.

DESCRIPTION OF THE PRIOR ART

Figure 1:
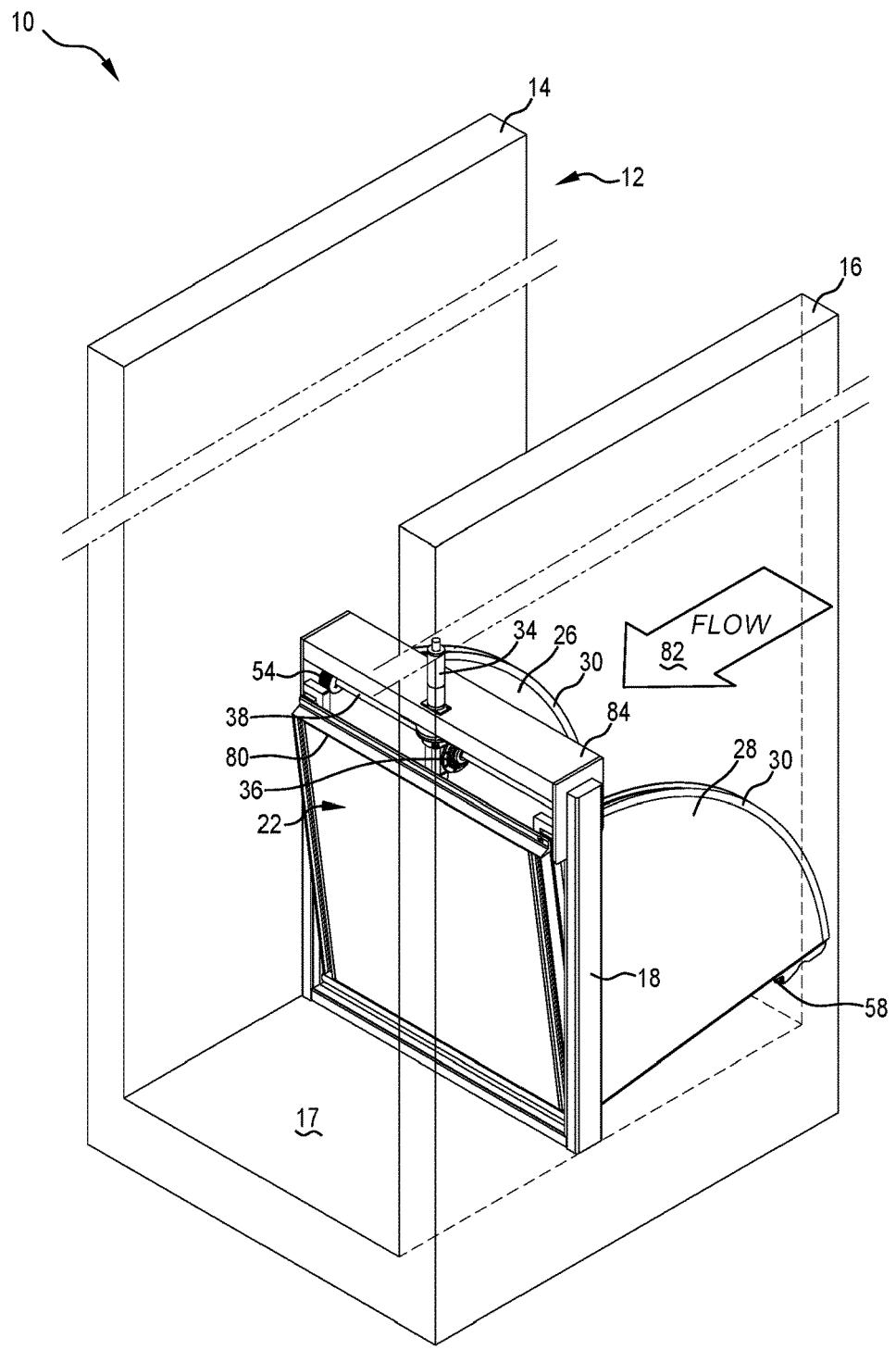
FIG. 1 is a perspective view of a control gate of the type disclosed in International Patent Application No. PCT/AU2001/001036.

In FIGS. 1 to 4 of the drawings there is shown a control gate 10 disclosed in published International Patent Application No. PCT/AU2001/001036 for controlling the flow of water through a channel 12. The full contents including description, claims and drawings of the published application are assumed to have been read and are incorporated herein by reference to avoid repetition of description. Channel 12 can be a drain, irrigation channel or other water course where flow must be regulated. Channel 12 has a pair of side walls 14,16 and a floor 17 in the form of a U-shaped channel. Although a U-shaped channel is shown the channel could be of any shape e.g. circular, trapezoidal or other shape. The channel 12 is usually formed of concrete to provide ease of construction and a smooth flow of water. Slots (not shown) are cut into opposing side, walls 14,16 for reception of a support frame 18 of control gate 10. Support frame 18 is U-shaped and will slide into the slots for an easy installation. Support frame 18 interlocks with the slots or other frame to provide structural stability for the assembly. Barrier member 22 is pivotally mounted at 23 to support frame 18.

Barrier member 22 is formed from a bottom plate 24 and a pair of circular arcuate side plates 26,28. Barrier member 22 can pivot to a fully closed position where bottom plate 24 is substantially vertical to a fully open position where bottom plate 24 is substantially horizontal.

By positioning bottom plate 24 in a position between the fully open and closed positions the rate of flow of water can be controlled. Side plates 26,28 have a right angular section with a circular arcuate section 30 along the hypotenuse. The right angular section can be substituted by more or less of an angle of 90°, if required. Bottom plate 24 is rectangular or square depending on the dimensions of channel 12. Seals 32, e.g., seal strips, run along the length of the support frame 18 to provide a water tight seal with barrier member 22 and prevent water bypassing flow through barrier member 22. The continuous seal strip 32 is provided on either side of the pivot 23 for barrier member 22 and is fixed within support frame 18 and extends the full length of support frame 18.

Figure 7:
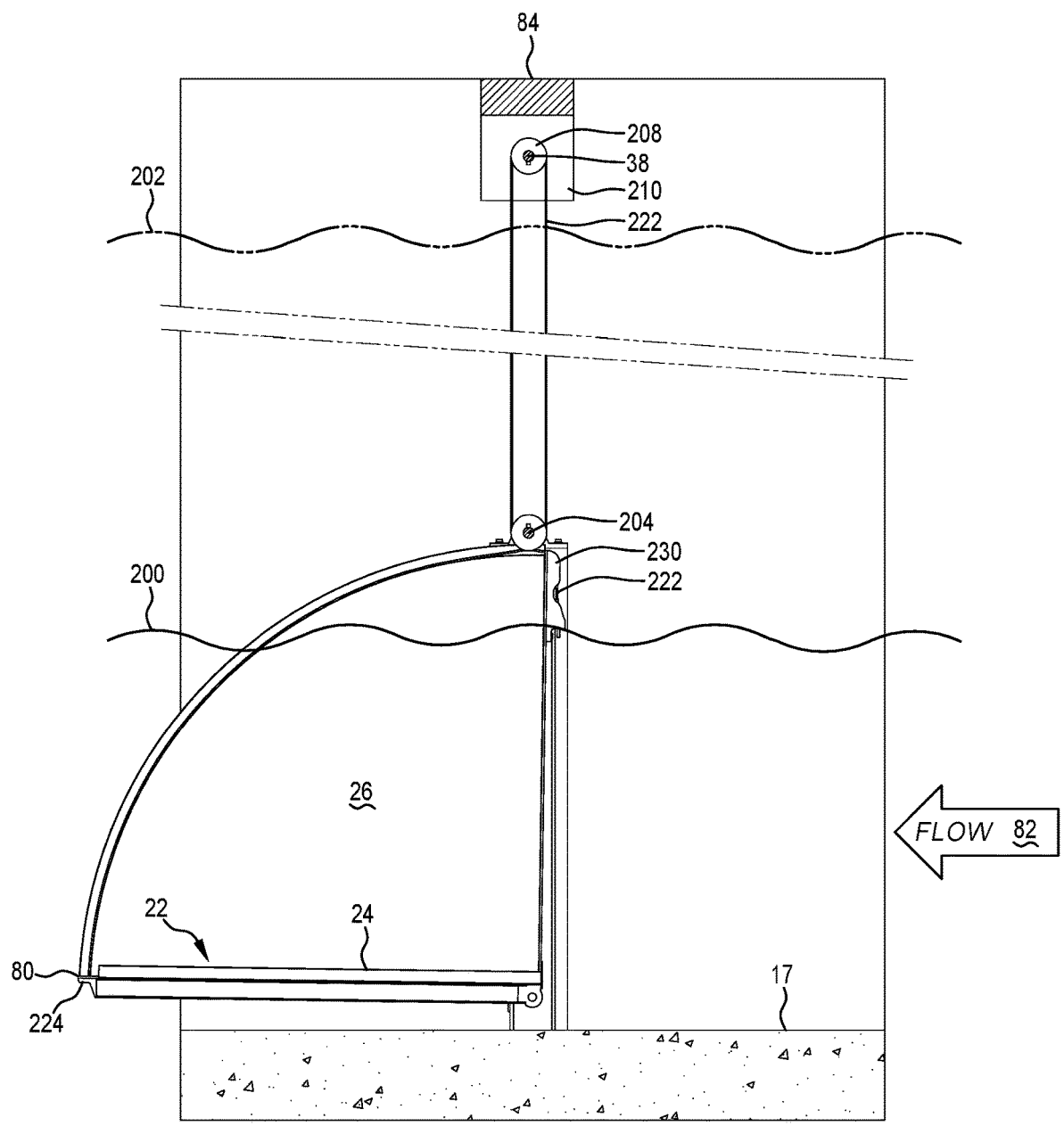
FIG. 7 is a cross-sectional view along and in the direction of arrows 7-7 of FIG. 6.

In order to control the flow rate accurately a motor 34 is fitted to a cross beam 84 on support frame 18. Motor 34 is used to lift barrier member 22. Motor 34 can be monitored by a circuit means (not shown) to determine the positioning of barrier member 22 or by a switch (not shown) for manual operation. Motor 34 is coupled to a reduction gear box 36 which has an drive shaft 38 which may be supported by bearings on either side of channel 12. In use, motor 34 is preferably monitored by a control panel (not shown) to which a plurality of control gates 10 may be connected. Motor 34 can be selected or deselected to control the angle of bottom plate 24 with respect to the floor 17 of channel 12. A pulley 54 and cables 56,58 provides movement of barrier member 22. Cable 56 is guided along the peripheral edge of circular arcuate section 30 and is secured at one end of barrier member 22 and at the other end to pulley 54, after looping therearound. Similarly cable 58 is guided along the peripheral edge of circular arcuate section 30 and is secured at the opposite end of barrier member 22 as shown in the sectional cut-out 86 in FIG. 3 and at the other end to pulley 54, after looping therearound. Cables 56, 58 can also be substituted by a single cable as shown in FIG. 7 of International Patent Application No. PCT/AU2001/001036. The positioning of cables 56,58 could be by the use of a channel on circular arcuate section 30 or a flange thereon. Rotation of pulley 54 by shaft 38 will cause lifting of barrier member 22 by either cable 56 being unwrapped from pulley 54 whilst cable 58 is wrapped onto pulley 54 or vice versa. Pulley 54 is located very close to circular arcuate section 30 and under tension to ensure that cables 56,58 do not lift from their peripheral contact therewith and maximize the mechanical advantage obtained from this positioning. Water will, in use, flow in the direction 82 over the lip 80 of barrier member 22

Figure 2:
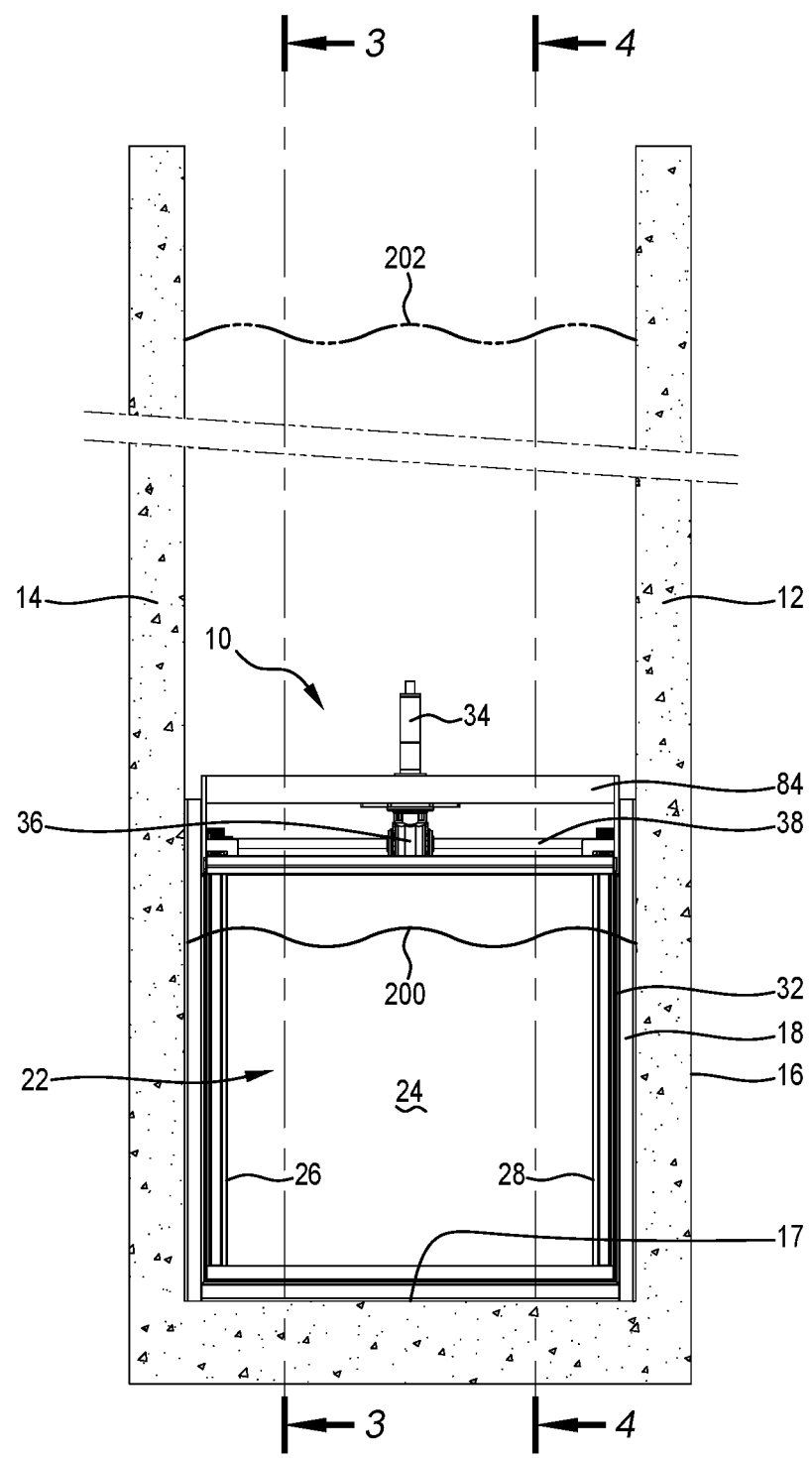
FIG. 2 is front view of the control gate shown in FIG. 1.
Figure 3:
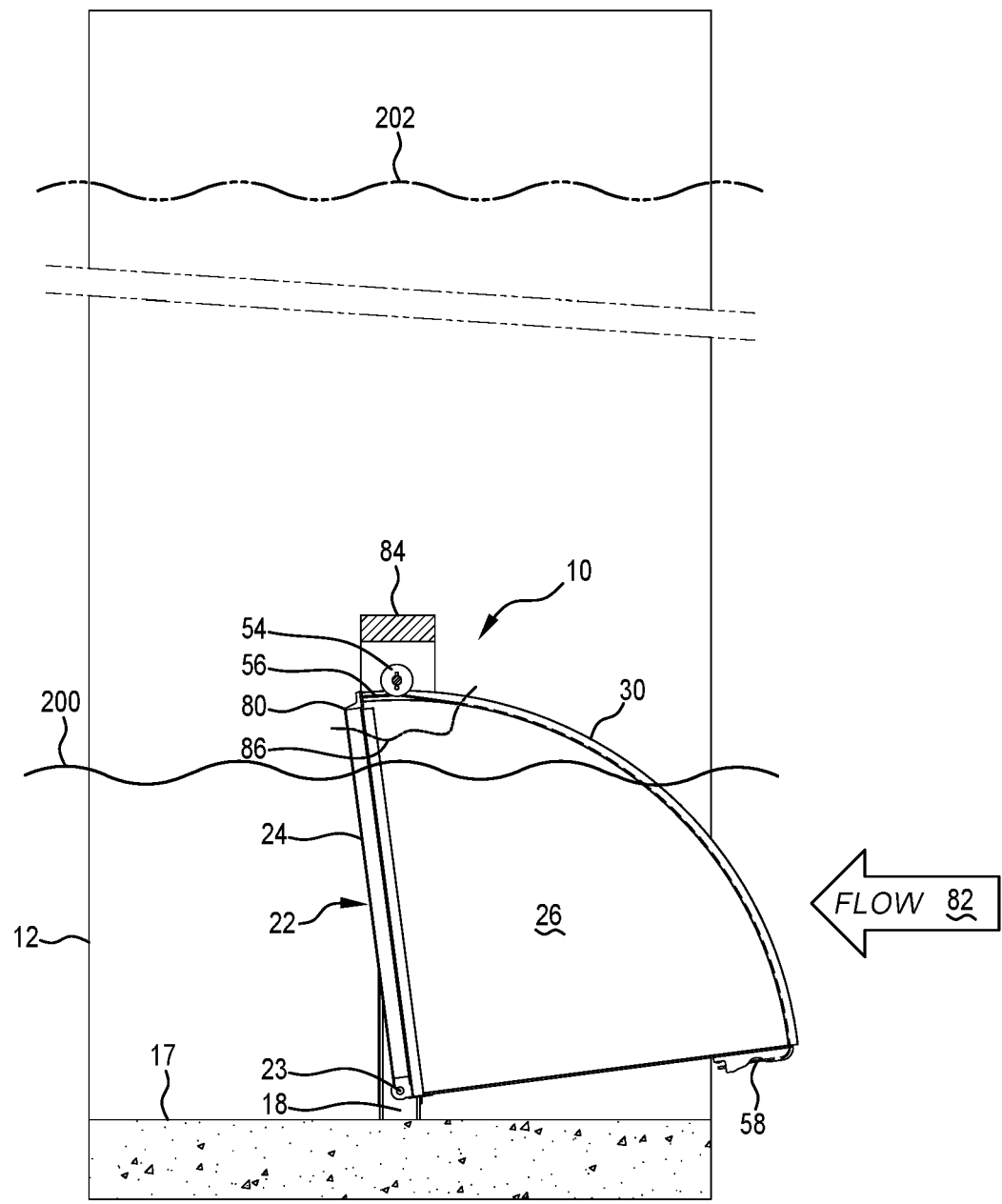
FIG. 3 is a cross-sectional along and in the direction of arrows 3-3 of FIG. 2.
Figure 4:
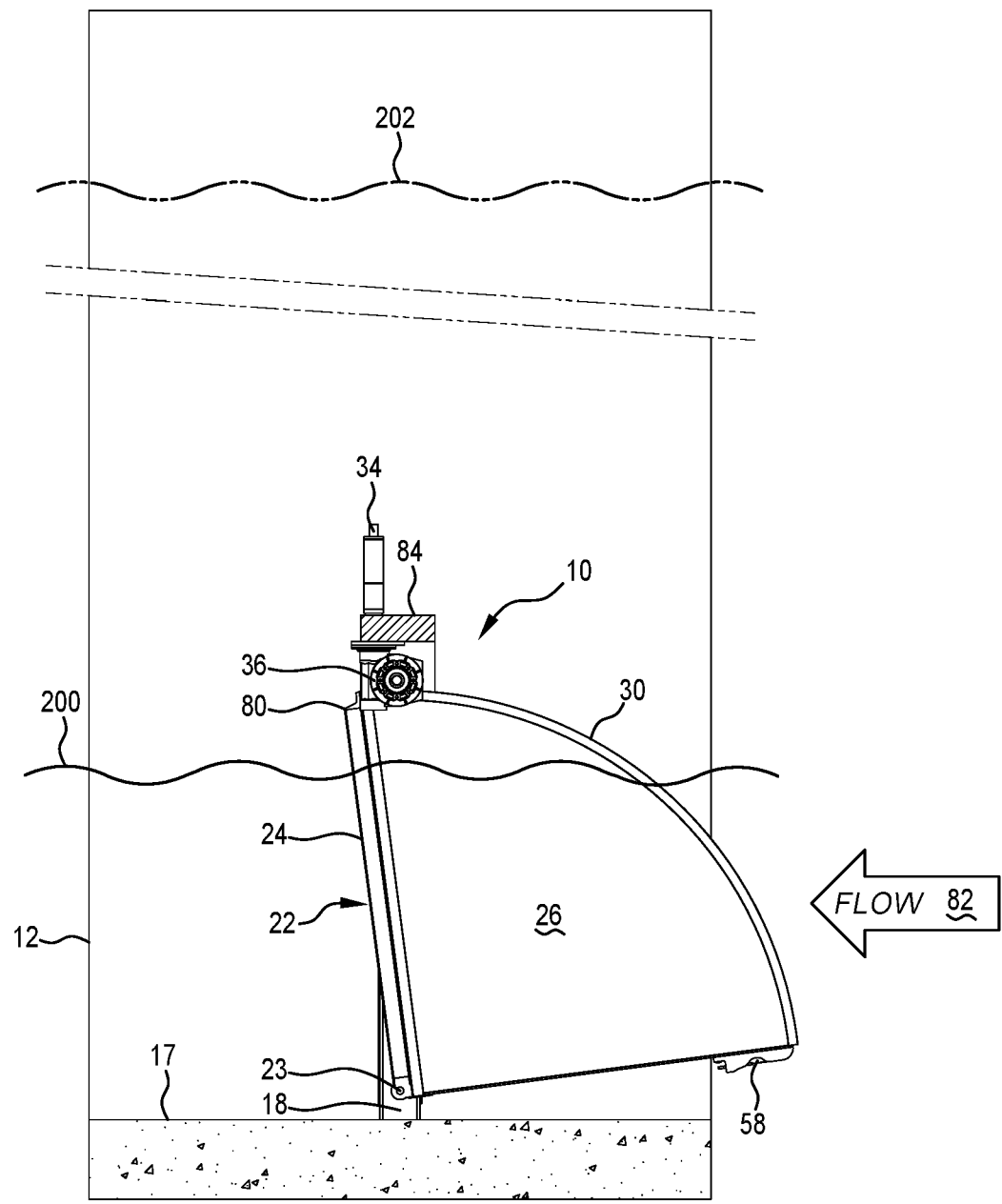
FIG. 4 is a cross-sectional view along and in the direction of arrows 4-4 of FIG. 2.
Figure 5:
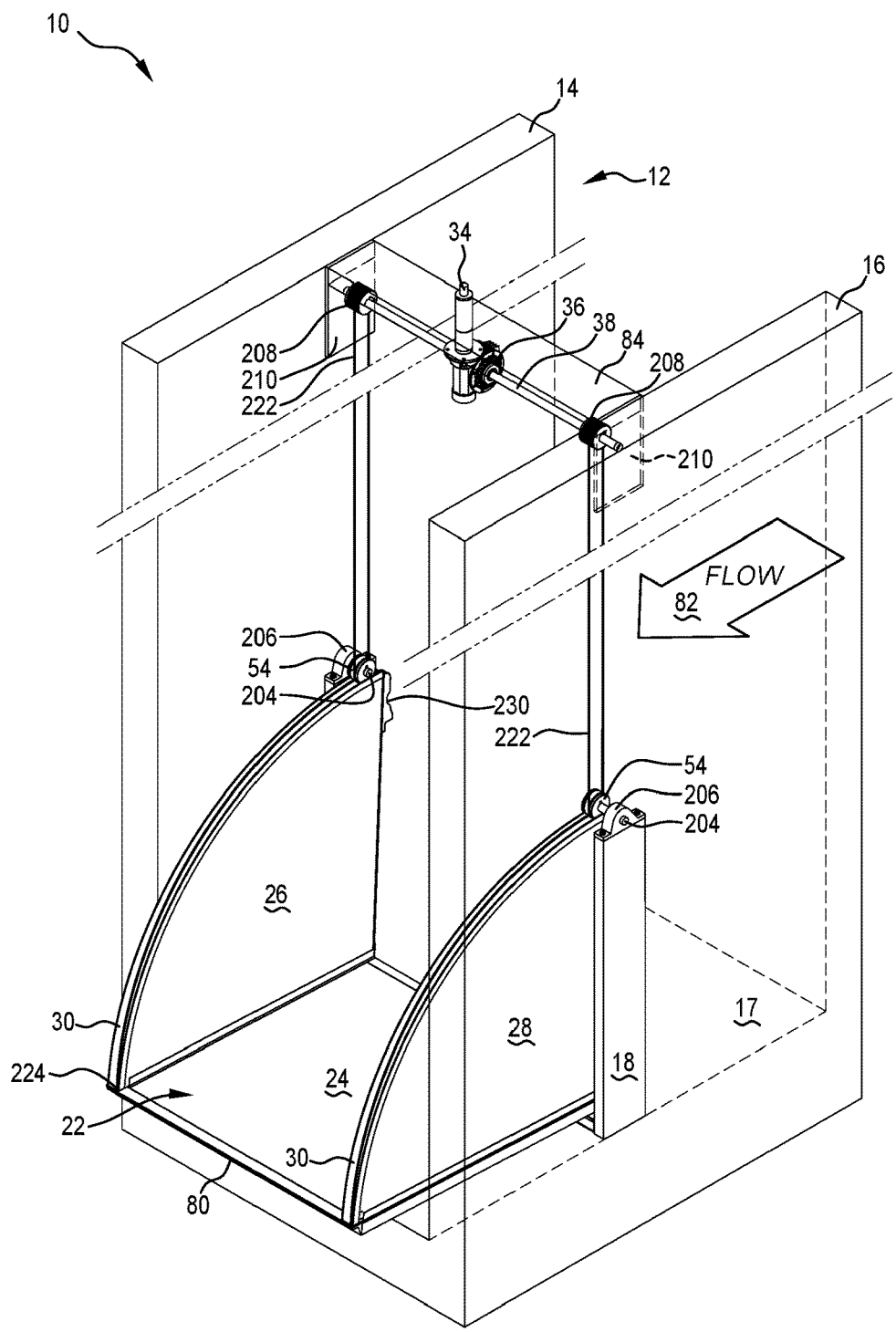
FIG. 5 is perspective view of a first embodiment of a control gate in accordance with the invention.
Figure 6:
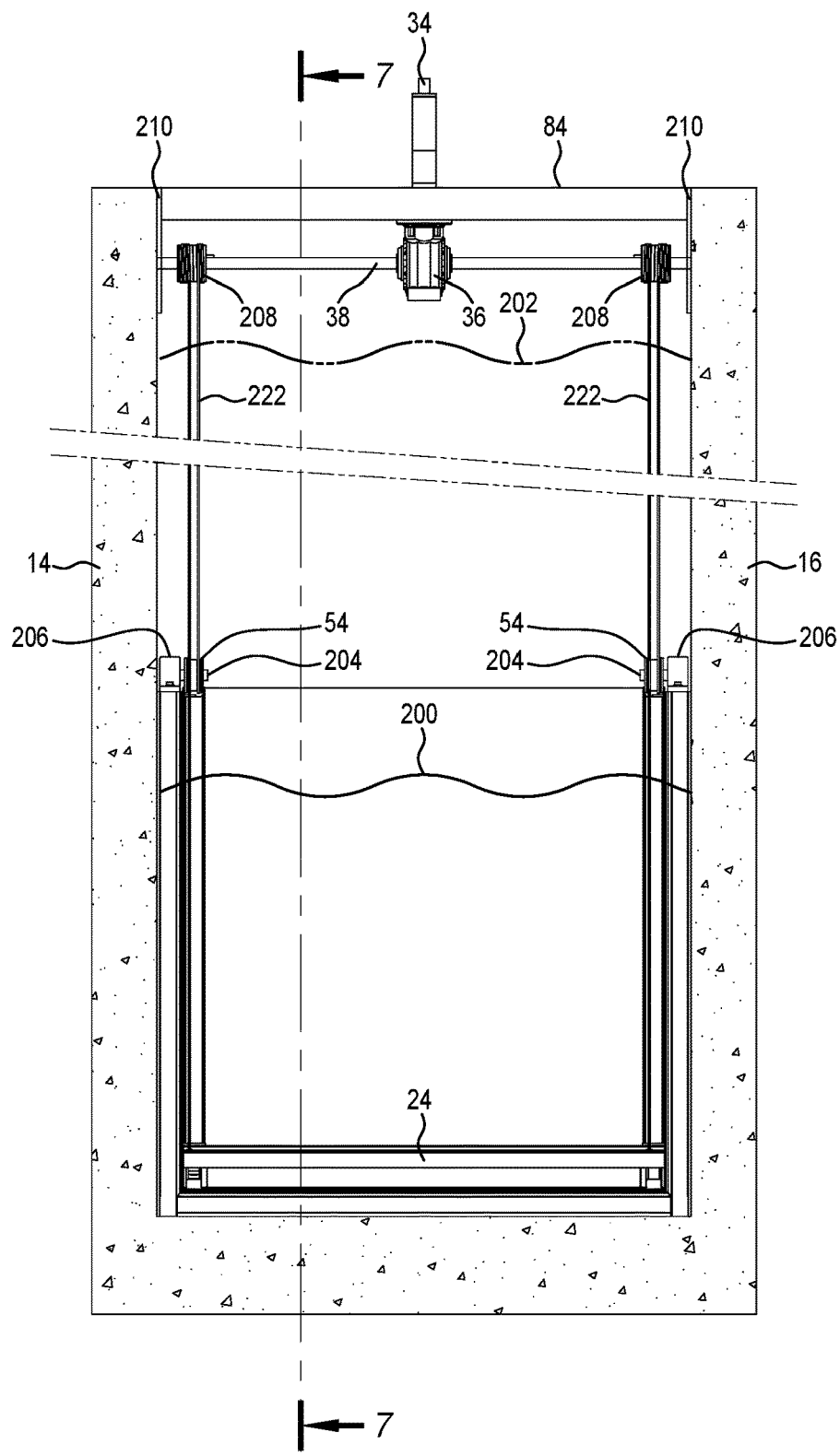
FIG. 6 is front view of the control gate shown in FIG. 5.

The control gate shown in FIGS. 1 to 4 has been very successful in the field but has a few limitations. The physical size of the control gate 10 that can be fitted to channel 12 is limited by the peripheral length of the circular arcuate section 30 and resulting circumferential spooling length of cables 56,58 around pulley 54. These limitations reduce the depth of channel 12 that control gate 10 can control the flow of water. FIGS. 2 to 4 show a typical usable depth 200 of water flowing in channel 12. Under flood conditions, the depth of water 202 may overflow channel 12 and water may submerge motor 34. Such an overflow may cause damage to motor 34 and any associated electronics.

Description of the Preferred Embodiments

Figure 8:
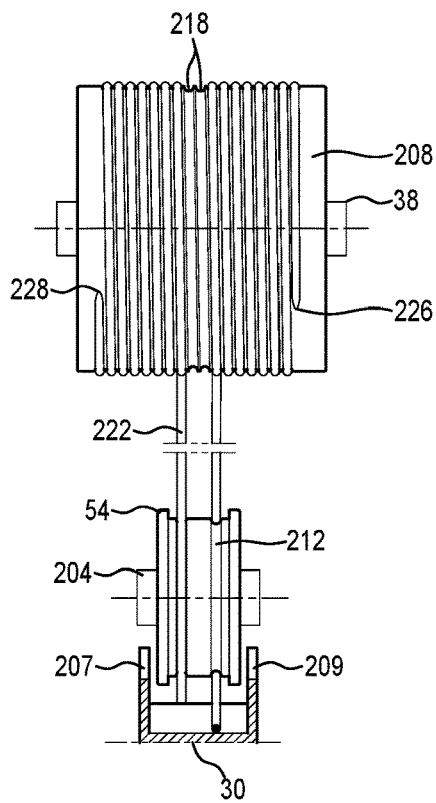
FIG. 8 is a front view of the pulleys of one side member of the control gate of FIG. 5 with a cross-sectional view through the circular arcuate section of side plate of the barrier member.

The embodiment of the present invention shown in FIGS. 5 to 7 and 12 will overcome the flood problem by allowing the motor 34 to be placed above flood line 202 of the control gate shown in FIGS. 1 to 4. In order to reduce repetition and duplication of description the same reference numerals used in FIGS. 1 to 4 will be utilized across all embodiments of the present invention described in FIGS. 5 to 12. The description of constructions and operation will be equally applicable, except for the specific differences between the constructions and operations between FIGS. 1 to 4 and FIGS. 5 to 12. In FIGS. 5 to 11, pulleys 54 are not connected to shaft 38 as they are locked to axles 204 rotatable in respective bearings 206 affixed to support frame 18. Grooves 212,214 (FIG. 10) provide a dual sheave operation to provide cable guidance for roll on and off motion of cable operation. A pair of flanges 207,209 are located on either side of circular arcuate section 30 and pulley 54 can protrude inside of flanges 207,209 as best seen in FIG. 8.

A further set of pulleys 208 are mounted at respective ends to drive shaft 38. Pulleys 208 are positioned to be above pulleys 54. The ends of drive shaft 38 are supported in bearings 210 forming part of cross beam 84. Motor 34 is coupled to reduction gearbox 36 to cause rotation of drive shaft 38 and pulleys 208. Pulleys 208 are typically larger in diameter than pulleys 54 and include multiple grooves 216, 217 across its annular periphery to provide cable guidance for roll on and off motion of cable operation. A pair of separator grooves 218 are provided to isolate the actions of the cable in a dual sheave operation of the pulleys 208. A bore 220 is provided to allow the cable operation to provide a pair of separated windings on either side of separator grooves 218.

Figure 9:
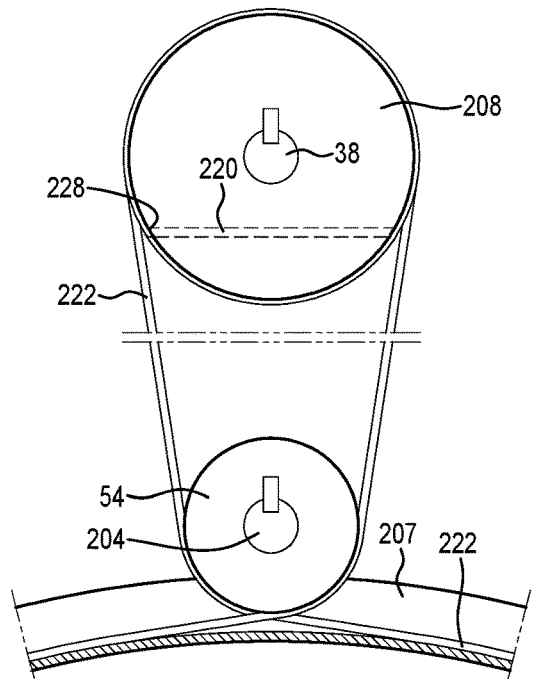
FIG. 9 is a side view of FIG. 8 with a cross-sectional view through the circular arcuate section of side plate of the barrier member.
Figure 10:
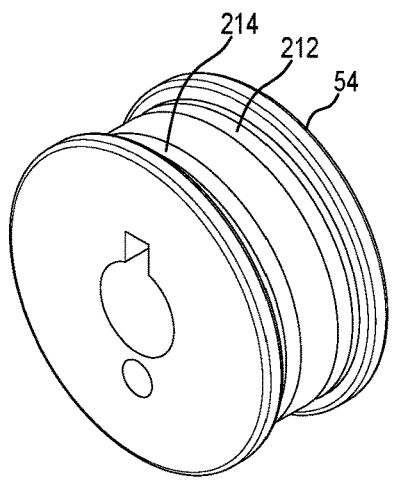
FIG. 10 is a perspective view of the lower pulley in FIG. 8.
Figure 11:
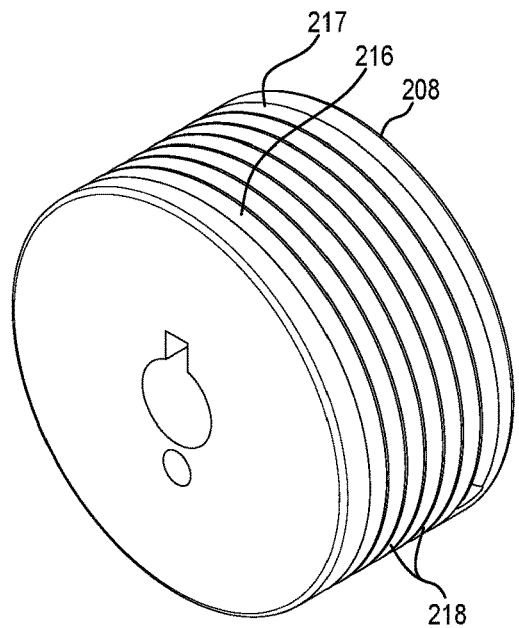
FIG. 11 is a perspective view of the upper pulley in FIG. 8.

In this embodiment a single cable 222 links respective pulleys 54,208. The movement of the cable is best seen in FIGS. 8 and 9. Cable 222 is secured at one end 224 of lip 80 of the free end of bottom plate 24. Cable 222 lies along circular arcuate section 30 between flanges 207,209 and then passes over pulley 54 along groove 212. Cable 212 continues upwardly adjacent separator grooves 218 of pulley 208 and wraps into grooves 217. Cable 222 exits the grooves 217 and passes through bore 220 at point 226 to exit at point 228. Cable 222 then wraps around pulley 208 towards separator grooves 218. Cable 222 then passes downwardly adjacent separator grooves 218 and mates with groove 214 of pulley 54 and passes under pulley 54. Cable 222 is then secured at a cable tensioner device 230 at the free end of side plate 26. Cable 222 is tensioned along its length with pulley 54 located very close to circular arcuate section 30 and under tension to ensure that cable 222 lifts very little from their peripheral contact therewith and maximize the mechanical advantage obtained from this positioning. Rotation of pulley 208 by shaft 38 will cause movement of barrier member 22 by cable 222 being unwrapped/wrapped from pulley 208 to rotate pulley 54 whilst cable 222 is simultaneously wrapped/ unwrapped onto pulley 208. The lengthening, shortening of cable 222 on either side of pulley 54 will result in a smooth movement of barrier member 22 under pulley 54.

The cable length between pulleys 54 and 208 together with the multi wrapping of cable around pulley 208 will allow a longer circular arcuate section 30 and thus a larger barrier member 22 to realised compared with the barrier member in FIGS. 1 to 4. The flood line 202 remains below motor 34, drive shaft 38, reduction gear box 36 and pulleys 208 to protect these integers from being waterlogged during flood conditions. The control gate 10 can also be fitted to deeper channels.

Figure 12:
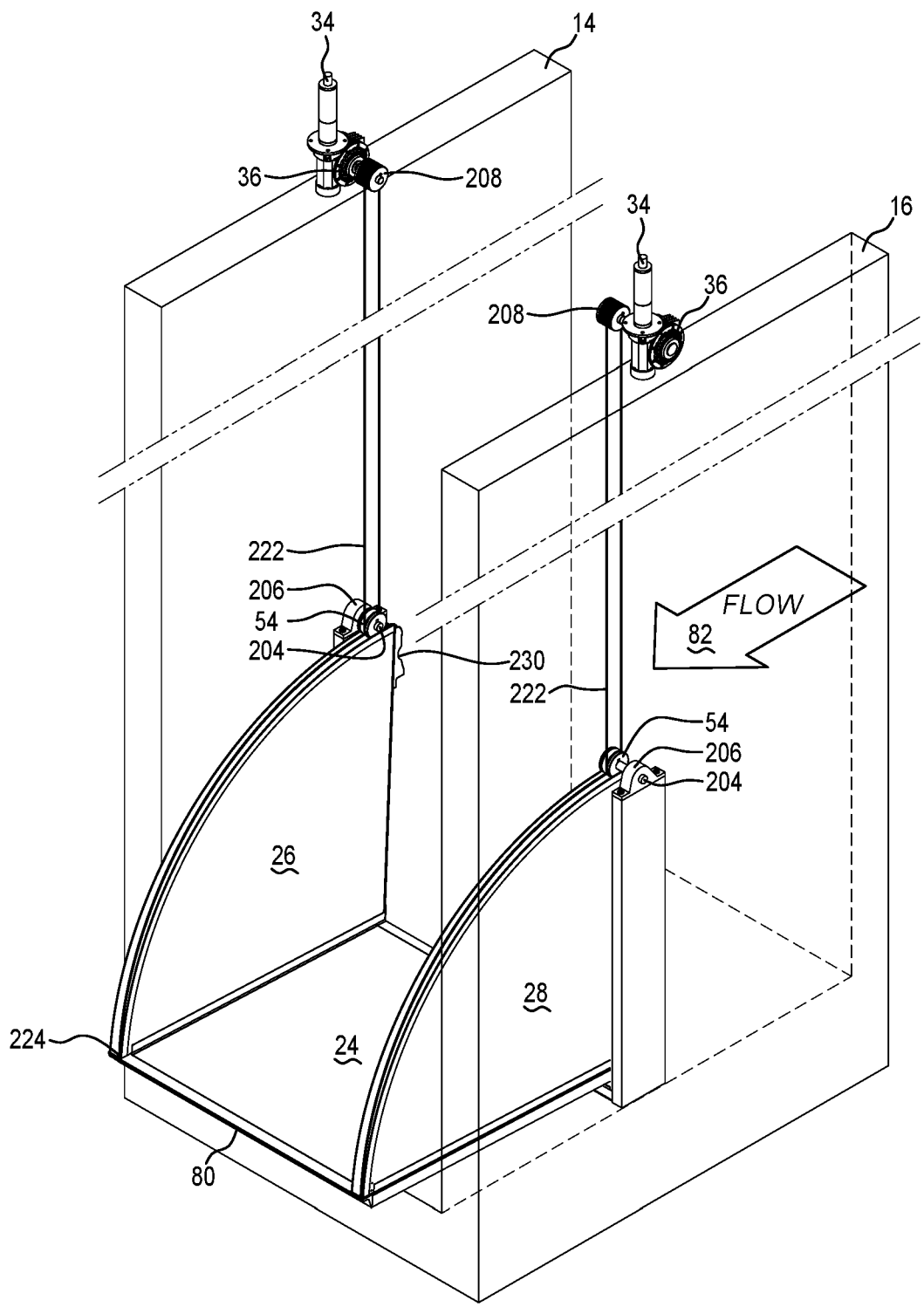
FIG. 12 is perspective view of a second embodiment of a control gate made in accordance with the invention.

FIG. 12 illustrates another variation of the embodiment shown in FIGS. 5 to 11. In this embodiment the drive shaft 38 is omitted and each pulley 208 is driven by a respective motor 34, reduction gear box 36 and axle coupled to each pulley 208. The motors 34 are mounted on the top of side walls 14,16. Each motor 34 is linked to a controller (not shown) that can synchronize operation of pulleys 208 to achieve equal displacement.

In other proposed embodiments, one or more circular arcuate plates (not shown) could be located between side plates 26,28 with associated pulleys and cables.

The pulleys and cables associated with side plates 26,28 may then not be required. Pulleys 208 could be at angle to pulleys 54 to further increase cable length and size of gate member. Bearings 210 could be removed allowing the pulleys 208 to be free of side walls 14,16 if drive shaft were of sufficient strength. Further adjustable tensioners may be provided to assist in cable tension adjustment e.g. movable roller or additional end of cable tensioner. Cable 222 can also be split into multiple parts in a manner disclosed in International Patent Application No. PCT/AU2001/001036.

An exemplary embodiment of the present application provides a control gate that has improved operation under flood conditions.

An exemplary embodiment of the present application provides a control gate that can be larger than traditional control gates.

The invention will be understood to embrace many further modifications as will be readily apparent to persons skilled in the art and which will be deemed to reside within the broad scope and ambit of the invention, there having been set forth herein only the broad nature of the invention and specific embodiments by way of example.

The invention claimed is:

1. A control gate adapted to be installed across a channel for liquids, the control gate comprising:
   a barrier member with a side member or offset member that has a circular arcuate section, said barrier member being pivotally mounted at or adjacent to a base of said channel; and
   a drive for raising and lowering said barrier member to regulate flow of liquid through said control gate, said drive including a cable, a motor and first and second pulleys, said first pulley coupled to said motor, said cable secured to opposite first and second ends of said circular arcuate section under tension with said second pulley being adjacent to said circular arcuate section, said cable passing along said circular arcuate section from said one end to pass under said second pulley in contact therewith, said cable then being looped under tension at least once around said first pulley located above said second pulley, said cable then passing under said second pulley in contact with the opposite face of said second pulley to be secured to said second end of said arcuate section in order to maintain said cable in a substantially peripheral contact with said circular arcuate section, said second pulley transferring rotary motion of said first pulley into motion of said side member or offset member to movement of said barrier member to regulate flow of water through said control gate.

2. The control gate of claim 1, wherein the motion of said side member or offset member is an angular displacement motion, and is mounted such that said side member tilting in one direction raises said barrier member and said side member tilting in an opposite direction lowers said barrier member.

3. The control gate of claim 1, wherein, based on the second pulley's direction, rotation of said second pulley will lengthen or shorten said cable on its the second pulley's opposing sides.

4. The control gate of claim 1, wherein said circular arcuate section includes a pair of flanges to guide said cable along said circular arcuate section.

5. The control gate of claim 1, further having a support frame, wherein said barrier member has two side members with respective circular arcuate sections and respective pairs of pulleys and cables, said side members sealingly engaged with said support frame within said channel.

6. The control gate of claim 5, wherein said respective first pulleys are coupled to opposite ends of a controlled motor driven shaft.

7. The control gate of claim 6, wherein said opposite ends of said controlled motor driven shaft are located in respective bearings on opposite walls of said channel.

8. The control gate of claim 5, wherein said respective first pulleys are coupled to respective controlled motors.

9. The control gate of claim 8, wherein each motor is mounted on a support beam bridging said channel.

10. The control gate of claim 8, wherein each motor is mounted on top of opposite walls of said channel.

11. The control gate of claim 1, wherein the distance between said first and second pulleys will depend on a depth of said channel.

12. The control gate of claim 1, wherein said first and second pulleys act in a dual sheave manner.

13. The control gate of claim 12, wherein each second pulley has a pair of grooves for said cable.

14. The control gate of claim 12, wherein the first pulley has a larger diameter and width than the second pulley, wherein the first pulley has multiple grooves formed thereon on either side of centre thereof for said cable.

* * * * *